United States Patent [19]

Curren

[11] 3,850,565

[45] Nov. 26, 1974

[54] APPARATUS FOR MANUFACTURING PRE-INKED STAMPS

[75] Inventor: Richard Curren, Chicago, Ill.

[73] Assignee: Consolidated Business Products, Addison, Ill.

[22] Filed: Oct. 29, 1973

[21] Appl. No.: 410,467

[52] U.S. Cl. ............................... 425/385, 425/406
[51] Int. Cl. ............................................ A01j 21/00
[58] Field of Search .......... 425/385, 383, 193, 445, 425/406

[56] References Cited
UNITED STATES PATENTS

| | | | |
|---|---|---|---|
| 3,533,352 | 10/1970 | Miller | 425/193 |
| 3,728,799 | 4/1973 | Streltson | 425/383 |
| 3,799,727 | 3/1974 | Howard | 425/383 |

*Primary Examiner*—James L. Jones, Jr.
*Attorney, Agent, or Firm*—Alter Weiss Whitesel & Laff

[57] ABSTRACT

Apparatus for manufacturing pre-inked stamps which apparatus comprises a compact cabinet containing a cold press and a hot plate with means for insuring the safe usage of both the cold press and the hot plate. The apparatus further includes a unique chase that assures the proper pressure on the material out of which the pre-inked stamp is fabricated so that the material is evenly embossed with the holygraphics desired.

8 Claims, 6 Drawing Figures

APPARATUS FOR MANUFACTURING PRE-INKED STAMPS

This invention relates generally to machines used for manufacturing marking stamps and more particularly, to machines for embossing porous material used in pre-inked stamps. Pre-inked stamps are produced from a porous rubber-like material without melting the material. The material, however, must be heated under pressure, with a die or mold therein, for embossing the material. The apparatus used in the past for embossing the pre-inked stamp material was relatively cumbersome. Further, the apparatus had many unsafe features. For example, it was found that when using the cold press, there was a tendency to tip over the cabinet containing the press. Further, unfortuitous contact with the hot plate many times caused unfortunate burns.

Yet further, in the older equipment, a hot plate was used in conjunction with the press. A unique self-locking chase is now used that is closed with a cold press and then heated. The heating of the unique chase with the porous rubber like material and die therein inherently applies the required pressure and temperature to emboss the material.

Accordingly, an object of the present invention is to provide unique and novel apparatus for use in manufacturing pre-inked stamps.

A further object of the present invention is to provide such apparatus in a compact cabinet.

Yet another object of the invention is to provide the apparatus for manufacturing pre-inked stamps wherein a unique self-locking chase is used for holding the master die and the porous rubber material on a hot plate so that a sufficient pressure to emboss the material is inherently applied.

Yet another object of the invention is to provide apparatus for manufacturing pre-inked dies that includes a cold press and a hot plate wherein means are provided for preventing the apparatus from tipping over when the cold press is utilized.

Yet another object of this invention is to provide apparatus for manufacturing pre-inked dies which utilize a hot plate wherein means are provided for assuring that unfortuitous burns do not occur through contact with the hot plate.

In a preferred embodiment of the invention the apparatus includes a single upstanding cabinet having therein a cold press and a hot plate. A console or chase is provided for holding the porous rubber like material and the plastic negative used for embossing the rubber-like material to create the pre-inked rubber stamp. The hot plate is protected by a safety plate which slidingly fits thereover to prevent unfortuitous burns.

A base safety plate assures the stability of the apparatus even while the cold press is used. A thermostat assures that the hot plate is at the right temperature to process the material in the chase. The unique chase assures proper pressure on the material to emboss the porous rubber-like material with the holygraphics thereon.

The apparatus provides an efficient and compact package enabling the manufacture of pre-inked stamps with ease and dispatch and with the minimum of risk of burning or of tipping the apparatus. The apparatus can be used by relatively unskilled production people.

For purposes of facilitating and understanding the invention the accompanying drawings illustrate a preferred embodiment thereof, from an inspection of which when considered in connection with the following description of the invention and its mode of construction, assembly and operation, objects, features and many advantages can be readily understood and appreciated.

Figure 1A:
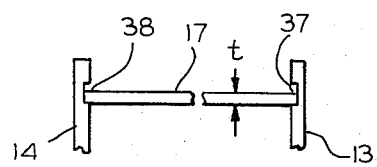
FIG. 1a shows details of the mounting of the top plate of the machine of FIG. 1.
Figure 1:
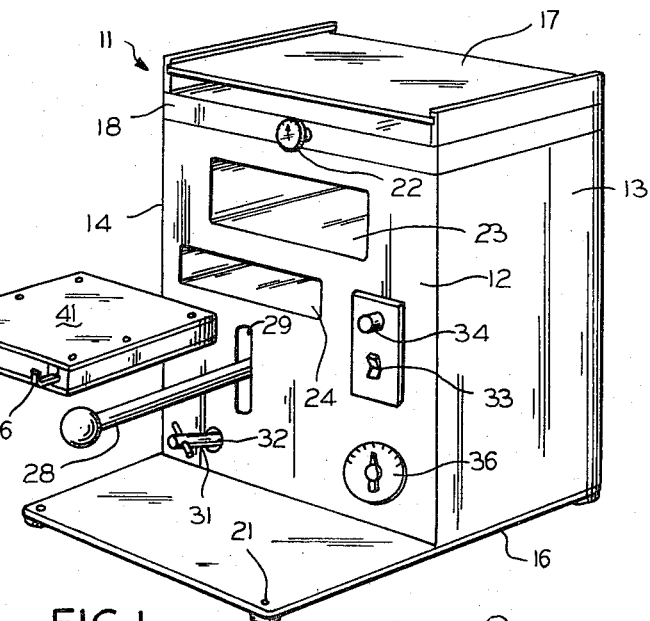
FIG. 1 is a pictorial drawing of the inventive machine for manufacturing pre-inked dies embodying the principles of the invention and showing the chase in position to be placed in the cold press.
Figure 3:
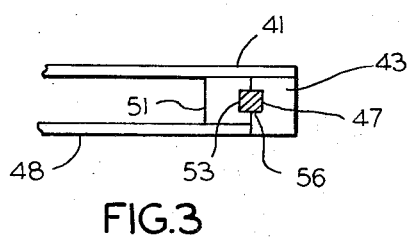
FIG. 3 is a partial sectional view showing the interlocking arrangement of locking rods lockingly interconnecting the top and bottom of the chase.

In FIG. 1 wherein the apparatus for processing the porous rubber-like material to manufacture pre-inked stamps is shown generally at 11. It comprises a cabinet having a front panel 12, side panel walls 13 and 14 and means for stabilizing the apparatus to keep it from tipping, such as the extended base 16. There is a slidable top plate 17 which, when moved aside, discloses a hot plate 18.

The entire cabinet preferrably rests on small rubber legs, such as rubber leg 19, fastened to the extended base 16, by fasteners, such as indicated at 21. The front panel 12 includes a temperature indicator 22 for relating the exact temperature of the hot plate 18. A storage area 23 is accessible through the front panel and is used for storing small accessories and supplies.

A cold press is accessible through slot 24 in the front panel 12. A chase 26, fits into the slot 24 where it can be compressed under hydraulic pressure or the like operating the cold press 27.

Figure 5:
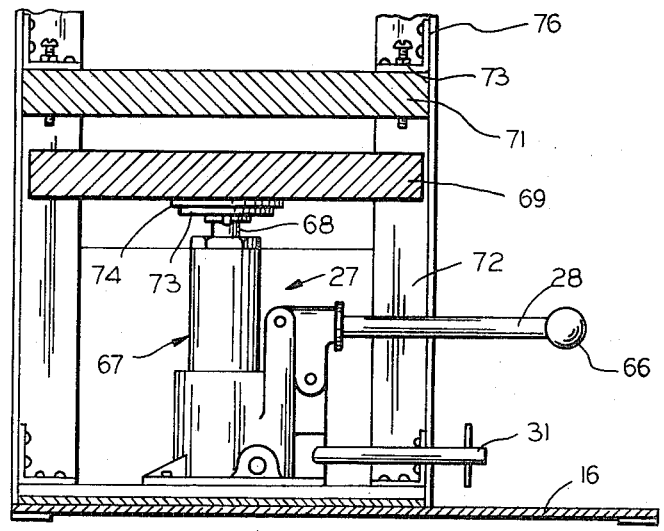
FIG. 5 is a partial cross sectional view of the apparatus showing the cold press.

The cold press 27 is shown in greater detail in FIG. 5. The press applies pressure to chase 26 in slot 24 when handle 28, which passes through slot 29 in the front panel, is operated. A releasing valve operated by handle 31 which passes through aperture 32 in the front panel 12 is provided on the hydraulic press.

The front panel 12 also contains the on-off power switch 33 and associated pilot light 34. The pilot light is connected in the circuitry so that when the power is on the pilot light 34 is also lit.

Means are provided for accurately setting the temperature of the hot plate. More particularly, thermostatic control 36 is provided on the front panel 12.

Means are provided for sliding the top plate of the cabinet 17 back and forth to either cover hot plate 18 and whatever is resting on the hot plate, such as chase 26, or to expose the hot plate and chase. More particularly, as shown in FIG. 1a, the side plates 13 and 14 contain slots 37 and 38 into which plate 17 slidably fits. The thickness t of plate 17 is less than the height of the slot making it easy to slide the plate 17 back and forth.

Figure 2:
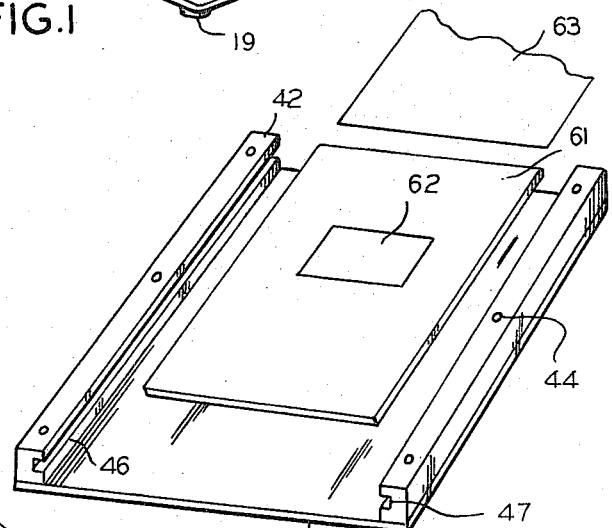
FIG. 2 is a pictorial representation of the chase and also showing the plastic dye and porous material used in the pre-inked stamp, as well as the release paper normally utilized in the manufacture of the stamp.
Figure 2:
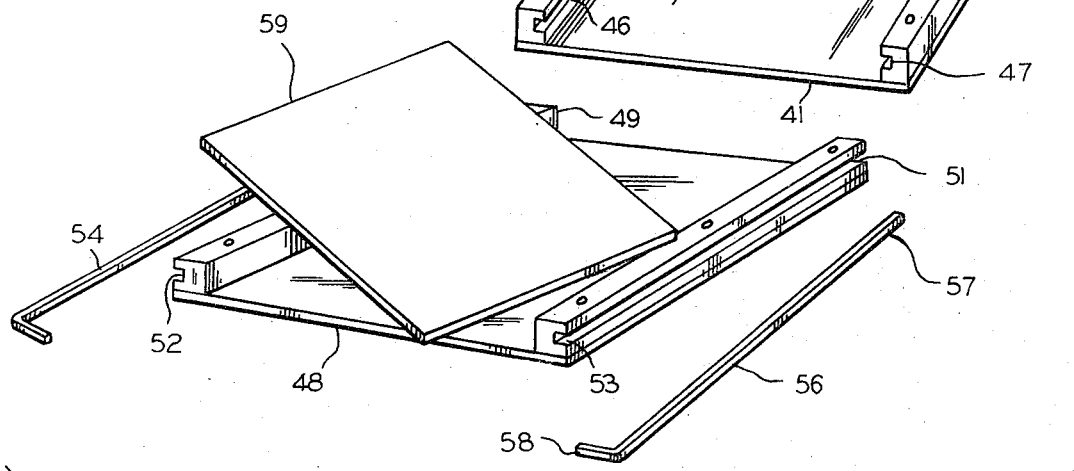

The exploded view of FIG. 2 shows the details of the chase 26. More particularly, the chase is comprised of bottom plate 41 having oppositely disposed bearer blocks 42 and 43 whose ends are tangential to the side ends of plate 41. The blocks 42 and 43 are held onto the plate with threaded fasteners such as fastener 44. In a preferred embodiment the threaded fastener passes through an untapped hole in the plate and threads into a tapped hole in the bearer block. Each of the bearer blocks 42 and 43 has a slot 46 and 47, respectively running the length thereof. The bearer blocks 43 and 42 are mounted on the plate so that the slots face each other. A top plate 48, that is narrower than the bottom plate, also has bearer blocks 49 and 51 oppositely disposed and tangential to the side end of the plate. These blocks are held onto plate 48 in the same manner as blocks 42 and 43. These top plate bearer blocks also have slots running the length thereof, such as slots 52 and 53, respectively. The slots 52 and 53 are aligned with the slots 46 and 47 of the plate 41. The slots face away from each other on the bearer blocks of plate 48. The bearer blocks are dimensioned so that when the plate 48 is placed onto the plate 41, the bearer blocks are contiguous to each other with the slots, 46, 52 and 47, 53 aligned with each other to make one large slot. The large slot of the combined blocks provide an opening for receiving locking rods 54 and 56 therein. The locking rods are shown as L-shaped longitudinal rectangles having a long side 57, for example, and a short side 58 on locking rod 56. The L-shaped portions provide handles for removing the locking rods from the slots when it is desired to disassemble the chase.

A piece of porous rubber-like material 59 is positioned within the plates. Placed on top of the porous material is the bakelite plastic die plate 61, having the depressed area shown at 62 which is the negative of the embossment desired. A piece of release paper 63 is placed between the plastic die 61 and the porous material used in the pre-inked dye material 59. The dimensions of the material 59 and the plate 61 are such that when these units are placed between plates 41 and 48, the slots of the plates do not align and therefore, the plates cannot be locked.

The plates in the unlocked condition with the material and die therein are placed into slot 24 of the press. In the press sufficient pressure is applied so the locking rods 54 and 56 can be inserted in the slots and the chase is locked together. This, of course, applies pressure forcing the die against the porous material. The porous material, therefore, is squeezed, forming the embossed area 62 which is a mirror image of what is on the die. After the plates are locked together and the chase is placed onto the hot plate 18, the heat applied shrinks the porous material and causes it to retain the mirror image embossment.

Figure 4:
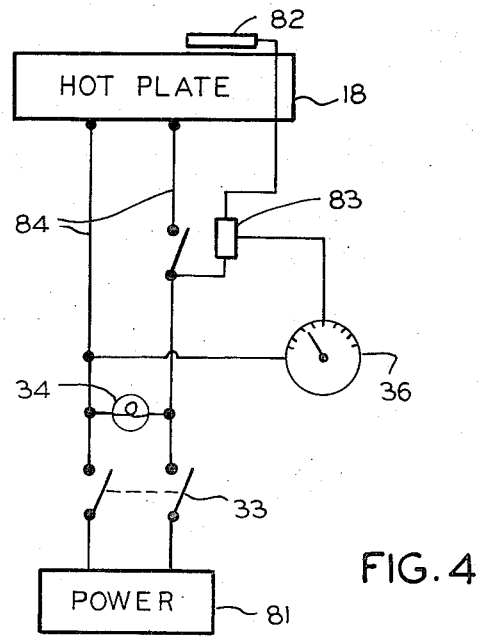
FIG. 4 is a schematic diagram showing the electrical arrangement of the apparatus.

Means, such as thermostat control are provided for setting the temperature to the desired level. As shown in the schematic of FIG. 4, the main power switch 33 when closed connects the line power 81 to the hot plate heating elements. A thermocouple sensor element 82 senses the temperature at the hot plate 18. As long as the sensed temperature is below the temperature set on the thermostat 36, switch 85 remains closed enabling power to extend to the hot plate through leads 84. When the sensed temperature is above the set temperature, then control means 83 opens switch 85 to remove power from the hot plate. The control means 83 and switch 85 can be the ordinary thermocouple coil and mercury switch commonly found in thermostatic controls.

As shown in FIG. 5, the hydraulic press 27 has a handle 28 with the spherical end 66 thereon. The handle is used to pump the hydraulic fluid in cylinder 67 causing piston 68 to extend therefrom. The piston 68 has attached thereto plate 72 and 73 forming a base for movable platten 69. The movable platten 69 operates in conjunction with stationary platten 71 to apply the pressure to the chase that is necessary for locking the plates of the chase together.

As shown in FIG. 5 the machine is preferrably comprised of corner angle irons, such as angle iron 74. The front and side panels are attached to the angle irons. The stationary platten is attached to a corner angle bracket, such as angle bracket 75 using adjustable screw and nut arrangement 76 so that the position of the stationary platten 71 can be adjusted to accomodate a wide variety of chases using materials of different thickness.

In operation then, the chase 26 is loaded with the porous material 59 and the die 61 with the piece of release paper 63 preferably placed therebetween. The thicknesses are such that the chase cannot be locked together; therefore, the cold press 27 is used to force the plates 48 and 49 together so that the chase can be locked together. This exerts a pressure of 5,000 – 6,000 lbs. per square inch on the material and the die. The locked chase is then placed on the hot plate by placing it underneath plate 17. The chase is then heated on the hot plate until it reaches 120°F as measured by an industrial thermometer. The temperature is checked periodically by slidingly removing the plate 17 to look at the thermometer. The chase is removed from the hot plate at that time and cooled to about 90°F at which time the chase may be unlocked. The porous material shrinks under the temperature and pressure used so that it is remove necessary to put any pressure on the chase to remve the locking rods. The porous material retains as an embossment the mirror image of the dye 61. The embossed porous material can be cut with the embossed portion placed on a stamp where it is now ready to be soaked with ink and used for a long period of time without the necessity of any further inkings.

When applying pressure, the handle 28 can be pumped without the risk of upsetting the machine 11 because of stabilized plate 16. Further, the safety plate 17 reduces any chance of unfortuitous burnings due to contact with the hot plate 18.

The machine is simple to operate, requiring a minimum of technical ability. One merely sets the dial to the required temperature. There is no necessity of reading the amount of pressure applied and judging the amount of pressure applied to the console press since enough pressure is applied to place the locking bars in place for locking the console press together. There also is no necessity for timing various steps since the application of heat is all that has to be watched. Therefore, bringing the material in the chase up to the required temperature insures a proper embossment.

While the principles of the invention have been described above in connection with specific apparatus and applications, it is to be understood that this description is made only by way of example, and not as a limitation on the scope of the invention.

I claim:

1. Apparatus for embossing porous material for use in pre-inked stamps, the apparatus comprises cabinet means, said cabinet means having a base thereon which extends beyond one side of said cabinet, press means mounted on said base and surrounded by said cabinet, means for controlling said press means extending through said one side of said cabinet, chase means for holding said porous material juxtaposed to a die to emboss said porous material with the holygraphics desired for the pre-inked stamps, said porous material and die being normally larger than the dimensions of said chase thereby requiring the use of said press means to close said chase, and hot plate means near the top of said cabinet for heating said closed chase, whereby said porous material is heated under pressure and embossed with the holygraphics.

2. The apparatus for embossing porous material of claim 1 including safety plate means mounted above said hot plate.

3. The apparatus for embossing porous material of claim 2 including means for slidably mounting said safety plate above said hot plate.

4. The apparatus for embossing porous material of claim 3 wherein thermostatic control means are provided for controlling the temperature of the hot plate, and industrial thermometer means mounted under said slidable safety plate to determine the temperature of the chase on the hot plate by sliding the safety plate away from its position above the hot plate.

5. Apparatus for embossing porous material for use in pre-inked stamps, said apparatus comprising chase means for holding said porous material contiguous to a die containing the negative of the required embossed holygraphics, said chase means including a top plate and a bottom plate, means for locking said top plate and said bottom plate together, bearer block means on each of said plates holding said plate spaced apart when locked together, and the dimensions of said porous material and die being normally greater than the dimension between said top plate and said bottom plate in the locked condition.

6. The chase means of claim 5 wherein said locking means includes grooves on said bearing lock means of each of said plates, said grooves being aligned with each other to form a larger groove, locking bar means fitting into said larger grooves to thereby lock said top and bottom plates together.

7. The chase of claim 6 wherein the bearer block means of each of said plates are peripherally mounted, the bearer block means of said bottom plate having grooves facing inwardly, the bearer block means of said top plate having grooves facing outwardly, said top plate being dimensioned so that the bearer blocks of said top plate fit between the bearer blocks of said bottom plate with the grooves aligned.

8. The chase of claim 6 wherein said locking bars are L-shaped, the longer portion of said L-shaped locking bars fitting in said aligned grooves, and the shorter portion acting as handles.

* * * * *

UNITED STATES PATENT OFFICE
CERTIFICATE OF CORRECTION

Patent No. 3,850,565　　　　　　　　　　Dated November 26, 1974

Inventor(s) Richard Curren

It is certified that error appears in the above-identified patent and that said Letters Patent are hereby corrected as shown below:

IN THE SPECIFICATION

Col. 4, line 36; before "necessary", "remove" should be --not--.

line 37; after "to", "remve" should be --remove--.

Signed and sealed this 18th day of February 1975.

(SEAL)
Attest:

RUTH C. MASON
Attesting Officer

C. MARSHALL DANN
Commissioner of Patents
and Trademarks